Nov. 20, 1951  J. S. ROBBINS  2,575,975

ROCK DRILL

Filed April 1, 1950

INVENTOR:
JAMES S. ROBBINS
BY
ATT'YS

Patented Nov. 20, 1951

2,575,975

UNITED STATES PATENT OFFICE 2,575,975

ROCK DRILL

James S. Robbins, Highland Park, Ill.

Application April 1, 1950, Serial No. 153,335

2 Claims. (Cl. 255—69)

This invention relates to rock boring devices and particularly to a type of calyx drills for use in rock materials, such as coal, which are friable and can be most rapidly bored by combining kerf cutting and core breaking operations in displacing material during the boring operation.

The main objects of this invention are to provide an improved form of boring device which is capable of removing friable rock in comparatively large pieces; to provide an improved form of calyx drill which is capable of simultaneously cutting concentric kerfs in the face of a rock wall and then breaking down the cores that stand between such kerfs by a wedging action; and to provide an improved drill of this type that is both efficient in operation and durable in construction.

Figure 1:
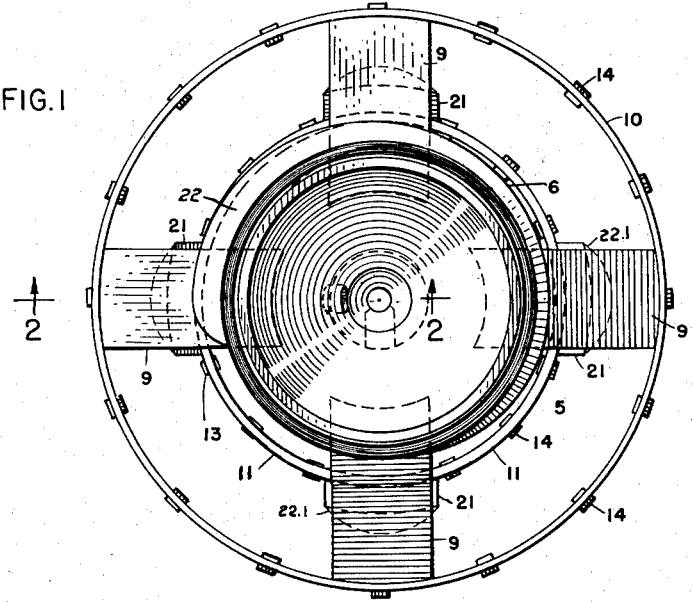
Figure 2:
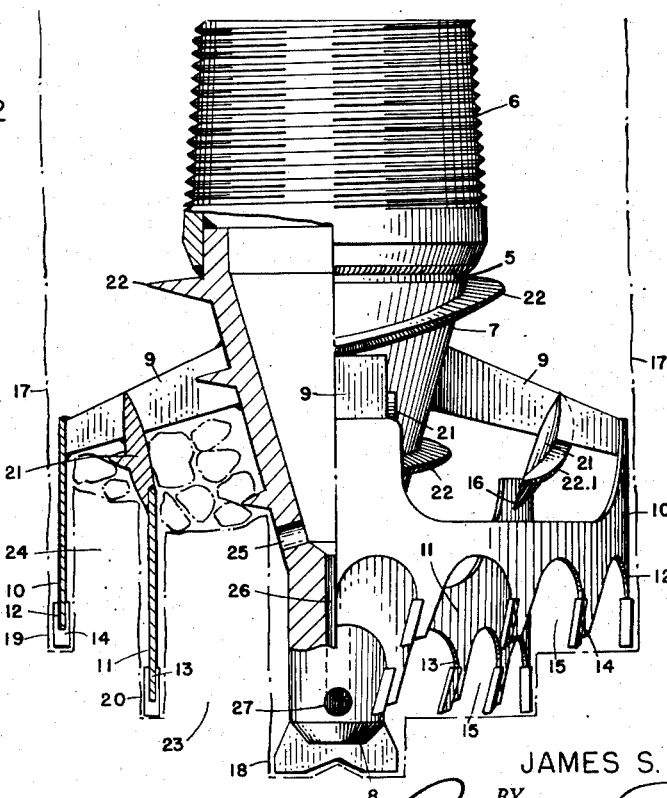

A specific embodiment of this invention is shown in the accompanying drawings in which:

Figure 1 is a top plan of a drill head constructed according to this invention; and Fig. 2 is a side elevation of the same with parts thereof shown in section on the line 2—2 of Fig. 1.

In the form shown in the drawings, the head 5 comprises a top portion 6 in the form of a tapered threaded nipple and a lower portion 7 of conical form tapering downwardly and having attached at its lower end a pilot bit 8 in axial alinement with the nipple and conical surfaces of the head 5.

Adjacent the upper part of the conical member 7 are a plurality of radially disposed spider arms 9 to the outer ends of which is attached a cylindrical calyx drill body 10 and one or more intermediate cylindrical calyx drill bodies 11. Each of these calyx drill bodies has a series of teeth 12 and 13 respectively formed on its lower periphery and these teeth are equipped with cutters 14 of hard material. The calyx drill bodies 10 and 11 are partly cut away to provide spaces 15 between their teeth and spaces 16 at their upper ends to permit the free passage of cuttings and rock fragments.

It will be seen from the drawings that the pilot bit 8 extends in advance of the calyx cutters and effectively guides its direction of movement and that the teeth 12 and 13 of the calyx cutters cut kerfs in the rock face concentric with the axis of the pilot bit. The shape of the cuts in the rock wall is generally indicated by the uneven line 17 in Fig. 2 and from which it is seen to comprise a central bore 18, an external kerf 19 that defines the outside diameter of the bore and an intermediate kerf 20.

As shown in Fig. 2, the toothed end of the inner cylindrical cutter 11 is located rearward of the cutting end of the pilot bit 8, and the toothed end of the outer cylindrical cutter 10 is located rearward of the cutting, or toothed, end of the inner cylindrical cutter 11. The conical portion 7 is flared rearwardly and outwardly from a point rearward of the cutters 13 of the inner cylindrical cutter 11. Similarly the inner cylindrical cutter 11 has associated therewith members 21 that flare rearwardly and outwardly from a point rearward of the cutting teeth 12 of the outer cylindrical cutter 10 to a point rearward of the body of the cutter 10.

The conical portion 7 of the head serves as a wedge for exerting outward pressure upon the annular core of rock that is formed between the bore 18 and the kerf 20. Similarly, the upper end of the intermediate cylindrical body 11 is connected to the arms 9 by a wedge formation generally of conical form flaring upwardly and outwardly for breaking down the core of material formed between the kerfs 20 and 19. The parts 21 are of conoidal outer contour and, due to their downward and rotary motion, break down the core of material in the same manner as is done by the cone 7. As shown, the parts 21 lie in a common conical surface concentric with the axis of cone 7 but the intermediate portions of such conical surface are omitted to provide clearance spaces between them for the passage of broken rock. A spiral screw rib 22 formed on the surface of the cone 7 tends to draw the cone into the bore 18 and helps to break down the core of rock 23. The conical surface defined by the parts 21 is similarly ribbed with a spiral rib or flange 22.1. These ribs are each preferably formed with constant pitch but increase depth from their lower to their upper ends.

In operation, the pilot bit directs the forward travel under the pressure exerted by the weight of the device and its operating stem or by pressure applied to the stem as will be understood; the calyx cutters 10 and 11 cut kerfs concentric with the bore 18; and the concentric cores 23 and 24 are then broken by outward pressure of the conical members 7 and 21.

The fragments of broken rock pass upward through the spaces between the spider arms 9 and are removed from the bore 17 by floatation with drilling mud or otherwise as is well known in this art.

The stem of the device shown is hollow and the head has passages 25, 26 and 27 for discharge of liquid or semiliquid boring fluids.

Although but one specific embodiment of this invention is herein shown and described, it will be understood that numerous details of the structure shown may be altered or omitted without departing from the spirit of the invention as defined by the following claims:

I claim:

1. A rock drill, comprising a head, a drill bit mounted thereon in axial alinement therewith, an inner cylindrical shell spaced concentrically outward from said bit and having a toothed cutting edge spaced axially rearward of the cutting end of said bit, said head having a wedging surface flaring rearwardly and outwardly from a point rearward of the cutting edge of said shell to a point rearward of said shell, an outer cylindrical shell spaced concentrically from said inner shell and having a toothed cutting edge spaced axially rearward of the cutting edge of said inner shell, wedge means spaced radially outward from said head and positioned to follow said inner shell into a rock kerf cut thereby and having a conoidal surface inclined outwardly and rearwardly from said inner shell so as to exert radially outwardly directed pressure against the core of rock standing between said shells, and means connecting said shells and wedge means to said head.

2. A rock drill, comprising a head, a drill bit mounted thereon in axial alinement therewith, said head having a conoidal wedge surface flaring backwardly and outwardly from the path of said bit and having a spirally ribbed formation, inner and outer cylindrical cutter shells spaced apart concentrically at different radial distances for cutting concentric kerfs in an opposed rock face, spider arms connecting said shells to said head, conoidal wedge members carried on said arms behind said inner shell substantially parallel with and spaced radially outward from said first-mentioned conoidal wedge surface to bear upon and break outwardly a core of rock formed between the kerfs cut by said shells, and spiral screw ribs on the outer side surfaces of said last-named wedge member.

JAMES S. ROBBINS.

REFERENCES CITED

The following references are of record in the file of this patent:

UNITED STATES PATENTS

| Number | Name | Date |
|---|---|---|
| 265,500 | Herron | Oct. 3, 1882 |
| 795,433 | Foust | July 25, 1905 |
| 1,572,386 | Gates | Feb. 9, 1926 |
| 1,831,841 | Brantly | Nov. 17, 1931 |
| 2,161,000 | Andersen | June 6, 1939 |